United States Patent [19]

Harpold

[11] Patent Number: 4,750,608
[45] Date of Patent: Jun. 14, 1988

[54] BELT TRACKING SYSTEM FOR SCREEN PRINTING CONVEYOR DRIERS

[75] Inventor: Charles W. Harpold, Grand Rapids, Mich.

[73] Assignee: Harco Graphic Products, Inc., Grand Rapids, Mich.

[21] Appl. No.: 854,148

[22] Filed: Apr. 21, 1986

[51] Int. Cl.⁴ .............................................. B65G 39/16
[52] U.S. Cl. .................................................... 198/807
[58] Field of Search ................ 198/807; 474/103, 106

[56] References Cited

U.S. PATENT DOCUMENTS

| 2,600,273 | 6/1952 | Seifried | 474/103 |
| 3,159,268 | 12/1964 | Dyke | 198/807 |
| 3,710,927 | 1/1973 | Alsted | 198/807 |
| 3,805,950 | 4/1974 | Becker | 198/807 |

Primary Examiner—Robert J. Spar
Assistant Examiner—D. Glenn Dayoan
Attorney, Agent, or Firm—Price, Heneveld, Cooper, DeWitt & Litton

[57] ABSTRACT

The specification discloses a belt tracking system for screen printing conveyor driers or the like which intentionally shifts the conveyor belt to the left or the right between controlled limits. As the belt is shifted one way, a desired limit is sensed and devices are provided for shifting it back the other way.

14 Claims, 4 Drawing Sheets

BELT TRACKING SYSTEM FOR SCREEN PRINTING CONVEYOR DRIERS

BACKGROUND OF THE INVENTION

The present invention relates to belt tracking systems, especially for use in screen printing conveyor driers. Such driers comprise a web of heat resistant screen material mounted over drive and idler rollers which conveys freshly printed matter through a drying oven. The problem is, the web of material which comprises the conveyor belt tends to wander towards one side or the other of the machine.

To solve this, some artisans use a crown roller, tending to create increased pressure on the center of the belt or web and thereby keep it on track. The problem with this approach is that it causes the belt to wear excessively in the center. This is particularly true in driers since the belt comprises a web of net-like material rather than a solid material.

Another attempt to solve this problem has been to provide a thrower roller adjacent either the idler or drive roller. If the conveyor belt is shifting one way, one positions the thrower roller so that it tends to throw the belt the opposite way. The problem with this approach is that constant attention to the belt position and constant readjustment of the thrower roller are both required. This results in part from the fact that the heat of the drier oven tends to cause changes in the configuration of the machine and/or the belt. Further, the belt material itself, being net-like and hence somewhat flimsy tends to change configuration as it is used.

Consequently, prior artisans have had considerable difficulty in keeping a conveyor belt, particularly in an environment such as a screen printing drier, tracking on a fixed path. Attempts to solve this problem have not met with great success.

SUMMARY OF THE INVENTION

The present invention solves the foregoing problem first by ignoring it. Instead of trying to hold the conveyor belt on a fixed path, the present invention comprises means for intentionally shifting the belt first left, and then right, between controlled limits. As the belt is shifted one way, a desired limit is sensed and means are provided for shifting it back the other way.

As a result, a belt can be kept from wandering off the ends of the rolls which carry it. The belt can be kept tracking within a relatively narrow range. These and other objects, advantages and features of the invention will be more fully understood and appreciated by reference to the written specification and appended drawings.

DESCRIPTION OF THE PREFERRED EMBODIMENT

Figure 1:
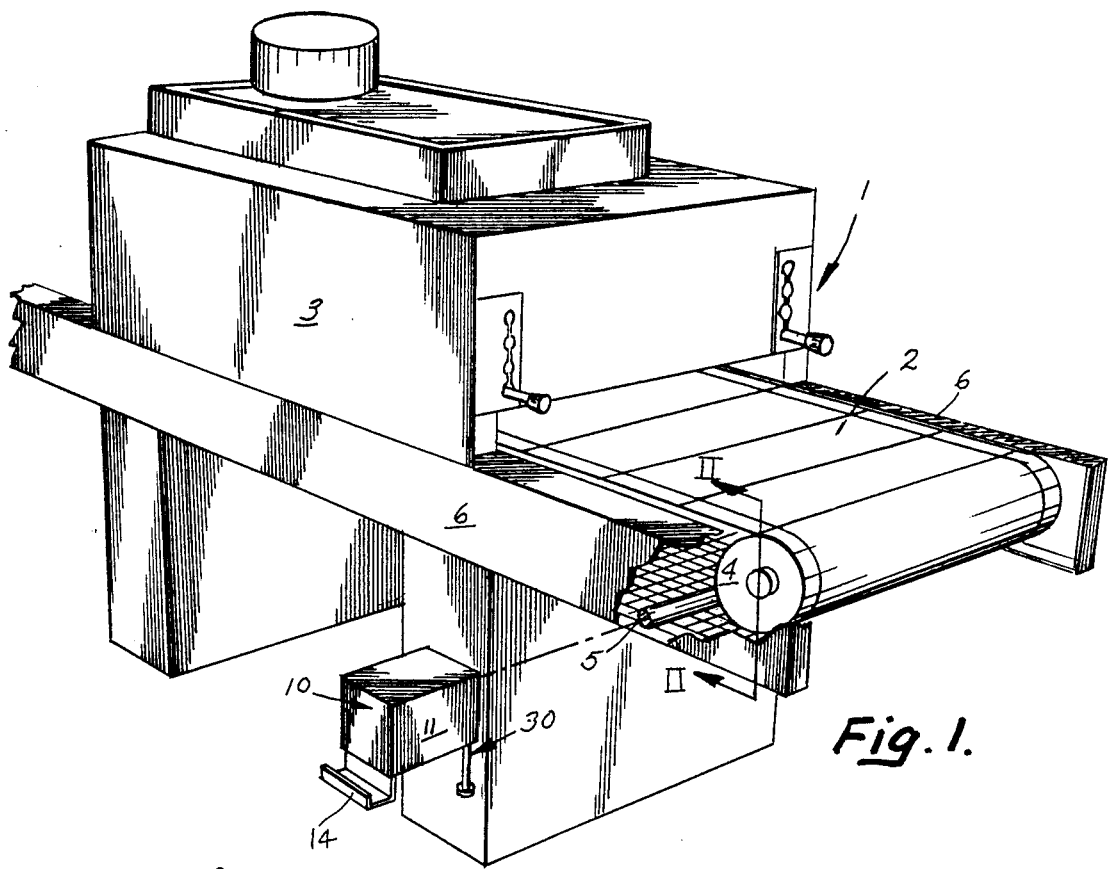
FIG. 1 shows a conveyor drier with the end portion of one side rail broken away and with the belt tracking device of the present invention exploded away from the side rail.
Figure 2:
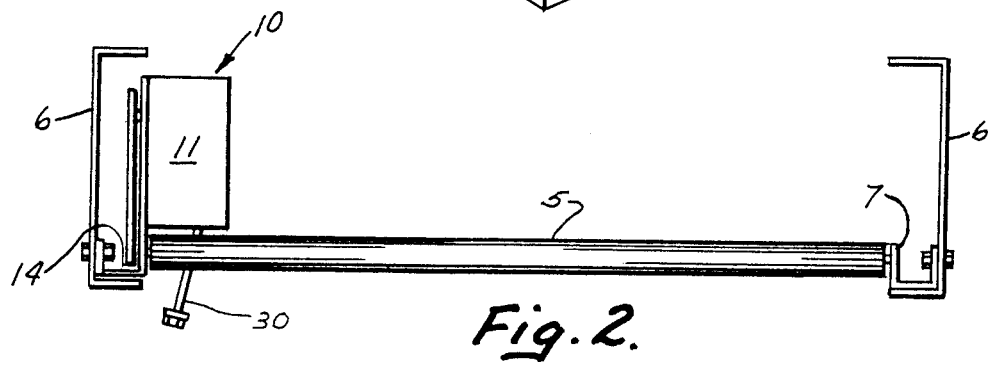
FIG. 2 is an end elevational view taken along plane II—II of FIG. 1, with the conveyor belt and the drying oven not shown.
Figure 3:
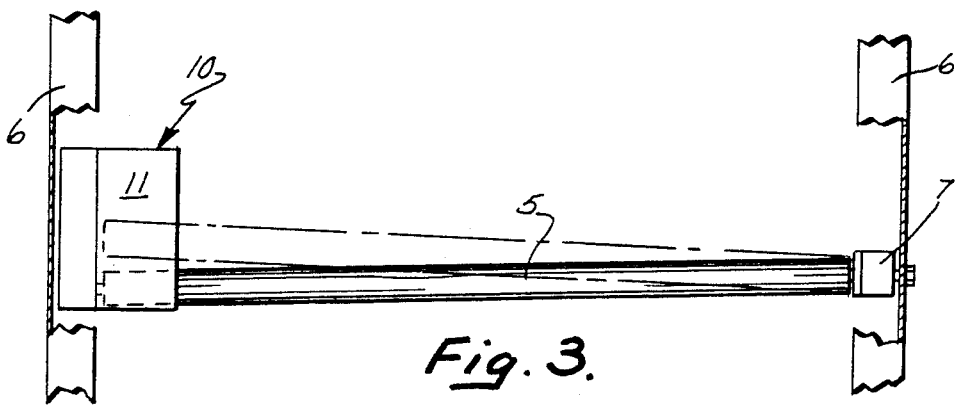
FIG. 3 is a top plan view of that portion of the conveyor illustrated in FIG. 2, with the conveyor belt removed.

In the preferred embodiment, the tracking device 10 of the present invention is mounted on the inside of a side rail 6 of a conveyor drier 1 adjacent a net-like conveyor belt 2 (FIGS. 1 and 2). Conveyor belt 2 is carried over a pair of spaced end rolls 4 and a thrower roller 5 positioned adjacent one of the end rollers 4. It conveys material to be dried beneath a drier oven 3. Thrower roller 5 is fixedly mounted to one side rail 6 by means of a fixed, but adjustable, mounting bracket 7 (FIGS. 2 and 3). Thrower roller 5 is mounted at its other end to tracking device 10 and is shifted fore and aft by tracking device 10 in the manner illustrated in FIG. 3. This shifting causes conveyor 2 to move either towards the right or towards the left of drier 1 as it is carried over in rollers 4.

Figure 5:
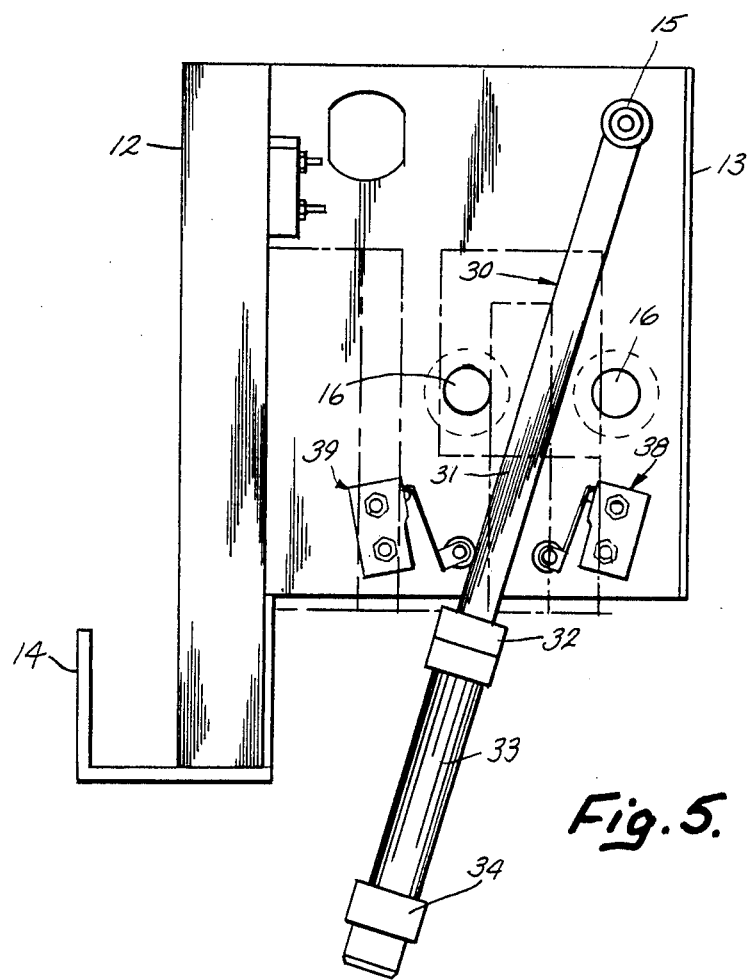
FIG. 5 is a side elevational view of the belt tracking device with the motor and pivot plate components removed.
Figure 8:
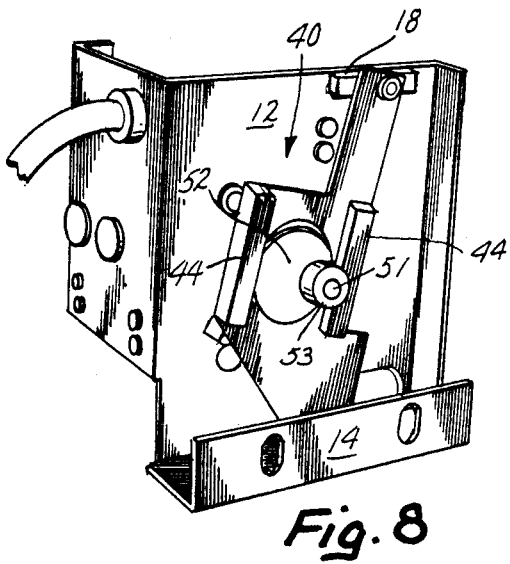
FIG. 8 is a rear elevational view of the tracking device with the pivot plate in one position.
Figure 9:
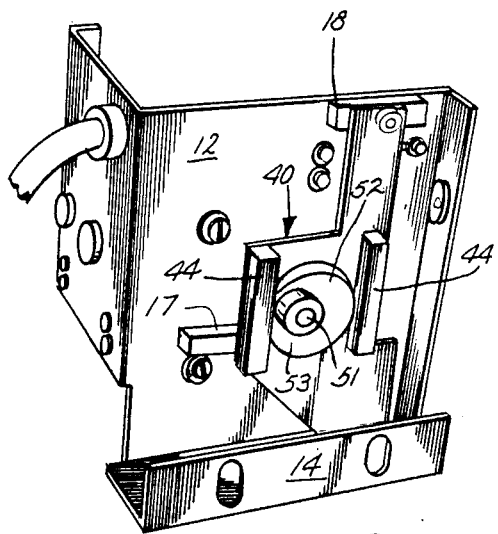
FIG. 9 is the same view as FIG. 8 with the pivot plate in its opposite position.

Tracking device 10 comprises a pendulum 30 which swings between limit switches 38 and 39 to indicate the lateral extremes to which conveyor belt 2 is allowed to travel (FIG. 5). Limit switches 38 and 39 activate motor 50 which rotates an eccentric cam 52, which in turn pivots a pivot plate 40 (FIGS. 8 and 9). Pivot plate 40 pivots back and forth between limit switches 48 and 49 (FIG. 6) which are normally closed, but which when engaged deactivate motor 50.

Figure 4:
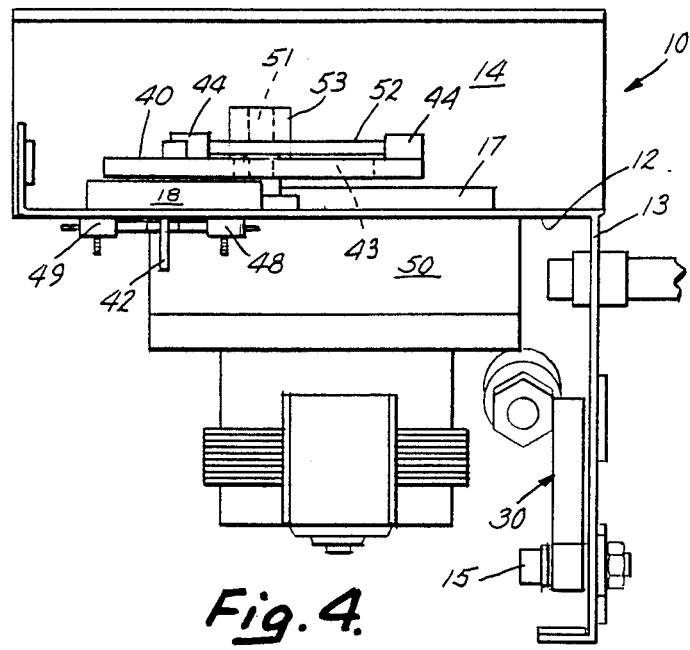
FIG. 4 is a top plan view of the belt tracking device of the present invention with its cover removed.
Figure 6:
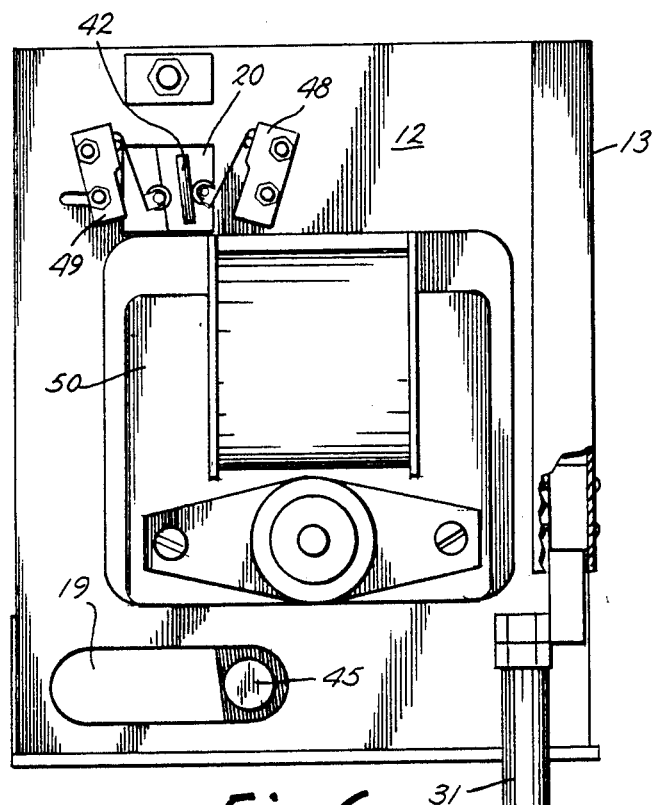
FIG. 6 is a front elevational view of the tracking device with the motor removed.

Tracking device 10 comprises a removable cover 11 (FIGS. 2 and 3) which seats on a main frame consisting of a back plate 12, a side plate 13 projecting laterally from one end of back plate 12 and a generally L-shaped mounting flange 14 projecting laterally from the bottom of back plate 12 in a direction opposite that to which side plate 13 projects (FIGS. 4, 5 and 6). Mounting bracket 14 includes appropriate holes on its vertical flange to facilitate mounting by bolts or the like to side rail 6 (FIG. 2).

A belt sensing pendulum 30 is pivotally mounted on side plate 13 at a slightly projecting pendulum mount block 15 (FIG. 5). It comprises a downwardly projecting upper leg 31 having a nut 32 welded to one end. A very smooth lower leg 33 with a large pendulum weight 34 on the bottom thereof is then threaded into nut 32. Lower leg 33 is made of a very smooth, hard material so that it does not damage conveyor belt 2 and is not readily worn down by belt 2 as it engages it. By making lower leg 33 removable, the possibility of damage to pendulum 30 during shipping is minimized by packing lower leg 33 separately.

Pendulum 30 extends downwardly from pendulum mount 15 at an angle and is movable between a pair of pendulum stops 16 mounted on and projecting from side plate 13 (FIG. 5). Positioned so as to be engaged by pendulum 30 at its extremes, and just prior to its engagement with stops 16, are a pair of normally opened limit switches 38 and 39. Pendulum 30 swings by gravity towards limit switch 38, but is carried by the movement of belt 2 towards switch 39. The purpose of stops 16 is to insure that pendulum 30 does not carry too far in either direction, especially towards limit switch 39, so as to damage the limit switches.

Pivot plate 40 (FIG. 7) is pivotally mounted on the back side of back plate 12 (FIGS. 4, 8 and 9). Pivot plate 40 is pivotally mounted at a pivot plate mounting boss 18 positioned on the rear of back plate 12 towards the top thereof. Pivot plate 40 slides back and forth over a projecting slide 17 mounted on the back of back plate 12.

Figure 7:
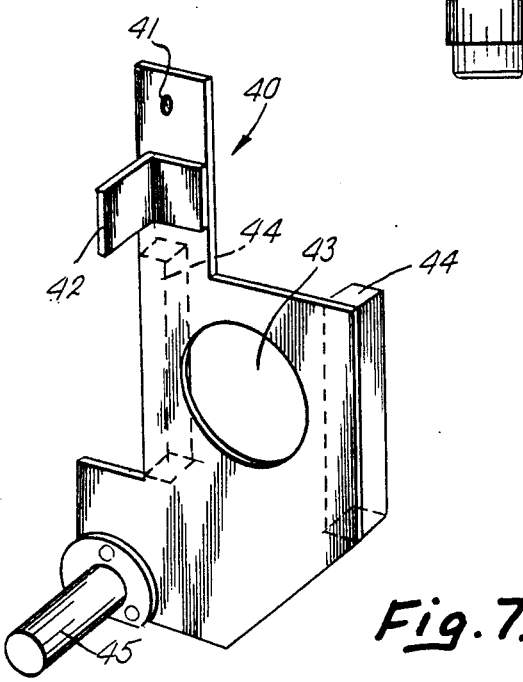
FIG. 7 is a perspective view of the pivot plate.

Pivot plate 40 comprises a pivot hole 41 at its upper corner to facilitate its pivotal mounting on mount 18 of back plate 12 (FIG. 7). Spaced below pivot hole 41 is a laterally projecting position indicator tab 42. Position indicator tab 42 projects through an indicator window 20 in main frame back plate 12 (FIG. 6). Mounted to either side of window 20 are a pair of limit switches 48 and 49. Tab 42 swings back and forth between limit switches 48 and 49 as pivot plate 40 pivots.

Positioned in the center of pivot plate 40 is a large drive axle opening 43 (FIG. 7). Positioned on either side of window 43 are a pair of cam follower bars 44 for engagement by cam 52 (see also FIGS. 8 and 9). Bars 44 project slightly from the surface of pivot plate 40 in a direction opposite that which tab 42 projects.

Thrower roller mounting axle 45 projects laterally from the front surface of pivot plate 40 adjacent the lower corner thereof (FIG. 7). It projects through an axle slot 19 in main frame back plate 12 so that thrower roller 5 can be mounted thereon (FIG. 6). Axle 45 travels back and forth in axle slot 19 as pivot plate 40 pivots. A conventional motor and gear box assembly 50 is mounted on the front side of back plate 12 (FIG. 4). A motor drive axle 51 extends through back plate 12, through the drive axle opening 43 in pivot plate 40 and into a receiving boss 53 on an eccentric cam 52 (FIGS. 4, 8 and 9). Eccentric cam 52 is bracketed by and engages cam follower bars 44 on pivot plate 40. As the motor drives shaft 51, cam 52 rotates and thereby causes pivot plate 40 to pivot between the extremes illustrated in FIGS. 8 and 9.

Figure 10:
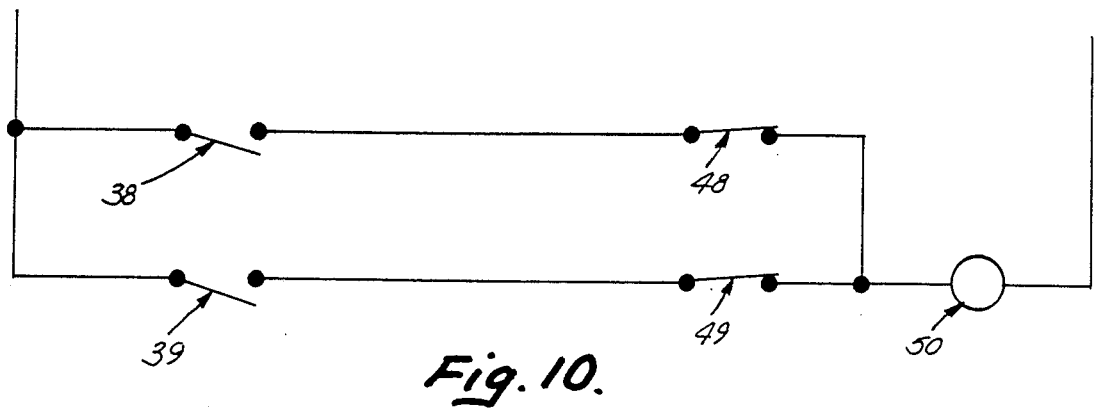
FIG. 10 is an electrical schematic of the control circuitry for the belt tracking device.

Limit switches 38 and 39 are normally opened, while limit switches 48 and 49 are normally closed (FIG. 10). When the thrower roller is in the position illustrated in solid lines in FIG. 3, the belt will track to the right as viewed in FIG. 3 and pendulum 30 will, by force of gravity, swing down until it engages and closes limit switch 38 (FIG. 5). Current flowing through closed switch 38 and closed switch 48 activates motor 50 which rotates eccentric cam 52. Cam 52 at this point is in the position illustrated in FIG. 9. As it rotates, it shifts pivot plate 50 back to the position illustrated in FIG. 8 until tab 42 engages and thereby opens limit switch 48 (FIG. 6). This brings thrower roller 5 into the forward position illustrated in phantom in FIG. 3. The opening of limit switch 48 breaks the current to motor 50 and thrower roller 5 remains in the position illustrated in phantom while the belt begins tracking back to the left as viewed in FIG. 3. As belt 2 tracks back to the left, pendulum 30 is eventually forced against limit switch 39 (FIG. 5), which closes a circuit through switch 49 to motor 50 and causes same to rotate. Cam 52 is rotated and carries pivot plate 40 back into the position illustrated in FIG. 9, at which point tab 42 engages and thereby opens normally closed limit switch 49 (FIG. 6), thereby breaking the current to motor 50.

In this manner, conveyor belt 2 is intentionally shifted from left to right and back again through the use of a single direction electrical motor and a pendulum indicator. The belt tracks back and forth within narrow limits and is prevented from riding off the end of end rollers 4.

Of course, it is understood that the above is merely a preferred embodiment of the invention and that various changes and alterations can be made without departing from the spirit and broader aspects thereof.

The embodiments of the invention in which an exclusive property or privilege is claimed are defined as follows:

1. In a screen printing drier conveyor or the like, having a conveyor belt, means for controlling shifting of said conveyor belt comprising:
    means for intentionally shifting said conveyor belt alternatively to the left or to the right with respect to the direction of travel of said conveyor belt in a predetermined reciprocation, said shifting means being movable between a first predetermined extreme position for shifting said conveyor belt to the right, past and through the centerline of the direction of travel of said belt, and a second predetermined extreme position for shifting said conveyor belt to the left, past and through the centerline of the direction of travel of said belt;
    right limit sensing means for sensing a right limit of travel of said conveyor belt;
    left limit sensing means for sensing a left limit of travel of said conveyor belt;
    control means responsive to said left limit sensing means for moving said shifting means completely to said first predetermined extreme position without reversing and responsive to said right limit sensing means for moving said shifting means completely to said second predetermined extreme position without reversing, wherein said control means moves said shifting means only from one predetermined extreme position to the other predetermined extreme position whereby when said conveyor belt reaches its right limit it begins to shift back to the left and when it reaches its left limit it begins to shift back to the right so that said conveyor belt is continually shifted from side to side in a predetermined reciprocation.

2. The apparatus of claim 1 in which said control means includes a motor operably connected to said shifting means for moving said shifting means between said first and second positions; said motor being activated by said left sensing means to move said shifting means to said first position and being activated by said right limit sensing means to thereby move said shifting means to said second position.

3. The apparatus of claim 2 which includes first position sensing means for sensing the presence of said shifting means in said first position and second position sensing means for sensing the presence of said shifting means in said second position, said first position sensing means being operably connected to said motor for deactivating said motor in response to sensing said shifting means in said first position and said second position sensing means being operably connected to said motor to deactivate said motor upon sensing said shifting means in said second position.

4. The apparatus of claim 3 in which said left limit sensing means and said right limit sensing means comprise normally open limit switches, closed when said conveyor belt reaches its respective left and right limits;

said first position sensing means and said second position sensing means comprising normally closed limit switches which are opened when said shifting means shifts to said first position or said second position respectively; said left limit sensing limit switch being connected in series with said first position sensing limit switch and with said motor in a first circuit; said right limit sensing limit switch being electrically connected in series with said motor and said second position sensing limit switch in a second circuit parallel to said first circuit.

5. The apparatus of claim 4 which includes a pendulum pivotally mounted on one side of said conveyor belt and biased by gravity into engagement with an edge of said conveyor belt; said left limit sensing means being positioned on one side of said pendulum and said right limit sensing means being positioned on the other side of said pendulum whereby as said pendulum pivots left or right in response to left and right shifting of said conveyor belt, it eventually comes into contact with and activates alternatively said left limit sensing means and said right limit sensing means.

6. The apparatus of claim 5 in which said shifting means comprises a thrower roller over which said conveyor belt passes, said thrower roller having a first end pivotally mounted on one side of said conveyor belt and a second end operably connected to said control means for movement between said first and said second positions.

7. The apparatus of claim 6 which includes a pivot plate mounted for pivotal movement between first and second positions and operably connecting said motor to said shifting means; said motor including an eccentric cam rotatably driven thereby; said pivot plate including cam follower means operably engaged by said cam on said motor whereby as said motor rotates said cam, said pivot plate is shifted between its said first and second positions.

8. The apparatus of claim 7 in which said pivot plate includes a position indicator; said first position sensing means and said second position sensing means being positioned on opposite sides of said position indicator whereby as said pivot plate is pivoted between its said first and second positions, said position indicator alternatively engages said first position sensing means and said second position sensing means respectively.

9. The apparatus of claim 3 which includes a pendulum pivotally mounted on one side of said conveyor belt and biased by gravity into engagement with an edge of said conveyor belt; said left limit sensing means being positioned on one side of said pendulum and said right limit sensing means being positioned on the other side of said pendulum whereby as said pendulum pivots left or right in response to left and right shifting of said conveyor belt, it eventually comes into contact with and activates alternatively said left limit sensing means and said right limit sensing means.

10. The apparatus of claim 3 in which said shifting means comprises a thrower roller over which said conveyor belt passes, said thrower roller having a first end pivotally mounted on one side of said conveyor belt and a second end operably connected to said control means for movement between said first and said second positions.

11. The apparatus of claim 3 which includes a pivot plate mounted for pivotal movement between first and second positions and operably connecting said motor to said shifting means; said motor including an eccentric cam rotatably driven thereby; said pivot plate including cam follower means operably engaged by said cam on said motor whereby as said motor rotates said cam, said pivot plate is shifted between its said first and second positions.

12. The apparatus of claim 11 in which said pivot plate includes a position indicator; said first position sensing means and said second position sensing means being positioned on opposite sides of said position indicator whereby as said pivot plate is pivoted between its said first and second positions, said position indicator alternatively engages said first position sensing means and said second position sensing means respectively.

13. A conveyor belt controller comprising:
   a bracket for mounting adjacent a conveyor belt, said bracket including a first mounting plate extending generally parallel to the direction of travel of said conveyor belt and a second mounting plate extending generally perpendicular therefrom and towards said conveyor belt;
   a pendulum pivotally mounted on said second mounting plate and including a relatively smooth shank for engaging said conveyor belt, said pendulum being pivotally mounted so as to be gravity biased into engagement with the edge of said conveyor belt;
   left and right limit switches positioned on opposite sides of said pendulum for engagement by said pendulum to serve as a left limit sensing means for sensing a left limit travel of said conveyor belt and a right limit sensing means for sensing a right limit of travel of said conveyor belt respectively;
   a pivot plate pivotally mounted on said first mounting plate for pivotal movement between first and second positions, said pivot plate including means for following a cam;
   a motor mounted on said first mounting plate and being operably connected to an eccentric cam for rotating said cam, said cam engaging said cam follower means whereby as said motor rotates said cam, said pivot plate is shifted between said first and second positions;
   said pivot plate including a position indicator, there being first and second position indicating limit switches positioned on opposite sides of said position indicator for engagement by said position indicator when said pivot plate is alternately in said first or second position;
   said pivot plate including a thrower roller mounting means whereby one end of a thrower roller can be operably connected to said pivot plate for shifting said conveyor belt to the right when said pivot plate is in said first position and for shifting said conveyor belt to the left when said pivot plate is in said second position;
   said left and right limit switches being normally opened, but closed when engaged by said pendulum;
   said first position and second position sensing limit switches being normally closed, but opened when engaged by said position indicator on said pivot plate;
   said left limit switch being electrically connected with said first position sensing limit switch and said motor in a first circuit and said right limit switch being electrically connected in series with said second position sensing limit switch and said motor in a second circuit which is parallel to said first circuit whereby when said pendulum engages said left limit sensing switch said first circuit is closed to activate said motor and pivot said pivot plate to said first position, at which point said position indicator engages and opens said normally closed first position sensing switch to thereby deactivate said motor leaving said thrower roller in a position which shifts said conveyor belt to the right, thereby eventually causing said pendulum to engage said right limit switch, closing said second circuit and activating said motor to thereby pivot said pivot plate into said second position at which point said position indicator engages said second position sensing limit switch and opens same to thereby open said second circuit and deactivate said motor with said thrower roller being in a position for shifting said conveyor belt back to the left.

14. A method for controlling left and right shifting of a conveyor belt in a screen printing conveyor drier or the like comprising:

intentionally shifting said conveyor belt alternatively to the left and right of the direction of travel of said belt between left and right limit sensing means so that said conveyor belt is continually shifted from side to side in a predetermined reciprocation, said predetermined reciprocation only including shifting said belt between a first predetermined extreme position and a second predetermined extreme position, such that said belt is intentionally shifted from one said predetermined extreme position in response to said right limit sensing means past and through the centerline of the direction of travel of said belt without reversing to the other said predetermined extreme position and intentionally shifting said belt back to the right past and through the centerline of the direction of travel of said belt without reversing to the one said predetermined extreme position in response to said left limit sensing means, whereby when said conveyor belt reaches its right limit it begins to shift back to the left and when it reaches its left limit it begins to shift back to the right so that said conveyor belt is continually shifted from side to side in said predetermined reciprocation.

* * * * *